US011800255B2

(12) United States Patent
Higashi

(10) Patent No.: US 11,800,255 B2
(45) Date of Patent: Oct. 24, 2023

(54) SOLID-STATE IMAGING DEVICE INCLUDING DRIVER CIRCUITS COMPRISING MULTI-STAGE BUFFER ELEMENTS

(71) Applicant: Nuvoton Technology Corporation Japan, Kyoto (JP)

(72) Inventor: Yosuke Higashi, Osaka (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 0 days.

(21) Appl. No.: 17/893,945

(22) Filed: Aug. 23, 2022

(65) Prior Publication Data
US 2022/0408048 A1 Dec. 22, 2022

Related U.S. Application Data

(63) Continuation of application No. PCT/JP2021/006886, filed on Feb. 24, 2021.

(30) Foreign Application Priority Data

Feb. 25, 2020 (JP) ................. 2020-029908

(51) Int. Cl.
*H04N 25/75* (2023.01)
*H04N 25/53* (2023.01)
(Continued)

(52) U.S. Cl.
CPC ............. *H04N 25/75* (2023.01); *H04N 25/53* (2023.01); *H04N 25/745* (2023.01); *H04N 25/772* (2023.01)

(58) Field of Classification Search
CPC ...... H04N 25/75; H04N 25/53; H04N 25/745; H04N 25/772
See application file for complete search history.

(56) References Cited

U.S. PATENT DOCUMENTS

2006/0001918 A1   1/2006   Okano et al.
2016/0353045 A1   12/2016  Kawahito et al.
(Continued)

FOREIGN PATENT DOCUMENTS

JP   2006-050566 A   2/2006
JP   2017-055328 A   3/2017
(Continued)

OTHER PUBLICATIONS

International Search Report dated May 18, 2021 in International Patent Application No. PCT/JP2021/006886, with English translation.

*Primary Examiner* — Nicholas G Giles
(74) *Attorney, Agent, or Firm* — McDermott Will & Emery LLP

(57) ABSTRACT

A solid-state imaging device includes: pixels disposed in a matrix of pixel rows and pixel columns; control wires provided for the pixel rows or the pixel columns, and each connected to at least two pixels out of the pixels, the at least two pixels being included in one of the pixel rows or the pixel columns for which the control wire is provided; drive circuits that are provided for the control wires, each include buffer elements in at least two stages, and each output a control signal to one of the control wires for which the drive circuit is provided, the buffer elements in the at least two stages being connected in series; and a first wire that short-circuits output wires of the buffer elements in one of the at least two stages in at least two of the plurality of drive circuits.

17 Claims, 11 Drawing Sheets

(51) Int. Cl.
*H04N 25/71* (2023.01)
*H04N 25/772* (2023.01)

(56) References Cited

U.S. PATENT DOCUMENTS

| 2017/0078594 | A1* | 3/2017 | Kawabata | H04N 25/702 |
| 2019/0074315 | A1* | 3/2019 | Yasu | H01L 27/14634 |
| 2019/0383917 | A1 | 12/2019 | Shinozuka | |
| 2021/0286083 | A1* | 9/2021 | Yasu | H03K 5/131 |

FOREIGN PATENT DOCUMENTS

| WO | 2015/119243 A1 | 8/2015 |
| WO | 2019/049662 A1 | 3/2019 |
| WO | 2019/123738 A1 | 6/2019 |

* cited by examiner

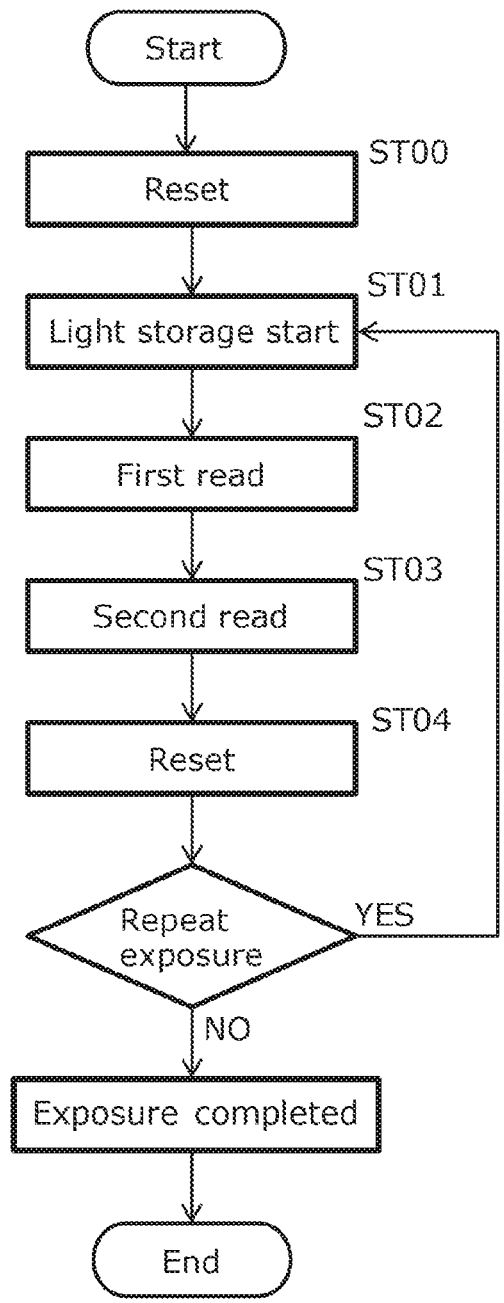

SOLID-STATE IMAGING DEVICE INCLUDING DRIVER CIRCUITS COMPRISING MULTI-STAGE BUFFER ELEMENTS

CROSS REFERENCE TO RELATED APPLICATIONS

This is a continuation application of PCT International Application No. PCT/JP2021/006886 filed on Feb. 24, 2021, designating the United States of America, which is based on and claims priority of Japanese Patent Application No. 2020-029908 filed on Feb. 25, 2020. The entire disclosures of the above-identified applications, including the specifications, drawings and claims are incorporated herein by reference in their entirety.

FIELD

The present disclosure relates to a solid-state imaging device typified by a charge coupled device (CCD) or complementary metal oxide semiconductor (CMOS) image sensor, and an imaging apparatus.

BACKGROUND

The time of flight (TOF) technique has been known which is for measurement using a flight time taken for light to travel and reach a measurement target object (a subject) to come back, among a plurality of techniques for detecting objects. In the distance measurement calculation using the TOF technique, at least two exposure signals are obtained from reflected light from a target object, and a time difference or a phase difference (time taken for light to travel and reach an object and come back) between light emission and light reception is calculated from the amount of the exposure signals obtained, thus calculating distance measurement.

A solid-state imaging device that measures a distance simultaneously exposes all the pixels so that a global shutter solid-state imaging device is used therefor, and simultaneously closes the shutter for all the pixels. Differences in shutter timings for the pixels appear as differences in distances for the pixels, and thus it is necessary to reduce temporal differences of the shutter to enhance accuracy of the distance measurement.

In order to address this, Patent Literature (PTL) 1 discloses technology for reducing temporal differences, in which a column skew correction circuit that adjusts, for each column, a delay time of a drive signal for controlling a shutter is provided.

CITATION LIST

Patent Literature

PTL 1: WO 2015/119243

SUMMARY

Technical Problem

However, PTL 1 requires adjustment of a delay time of a drive signal for each column, and thus requires calibration for each solid-state imaging device. For calibration, it is necessary to actually calculate a distance and feed back the result to a delay adjuster, which requires more time and more steps. In addition, the circuit scale increases. If the temperature or the voltage changes, a delay time also changes, which requires calibration each time such changes are made. If calibration is not performed, a delay time differs for each column, and accuracy in measurement decreases.

The present disclosure has been conceived in view of the above problem, and is to provide a solid-state imaging device and an imaging apparatus that achieve high measurement accuracy by reducing a difference in delay of a drive signal for each column while calibration for adjusting a delay time of a drive signal for each column is unnecessary.

Solution to Problem

In order to address the above problem, a solid-state imaging device according to an aspect of the present disclosure includes: a plurality of pixels disposed in a matrix of pixel rows and pixel columns; a plurality of control wires provided for the pixel rows or the pixel columns, and each connected to at least two pixels out of the plurality of pixels, the at least two pixels being included in one of the pixel rows or the pixel columns for which the control wire is provided; a plurality of drive circuits that are provided for the plurality of control wires, each include buffer elements in at least two stages, and each output a control signal to one of the plurality of control wires for which the drive circuit is provided, the buffer elements in the at least two stages being connected in series; and a first wire that short-circuits output wires of the buffer elements in one of the at least two stages in at least two of the plurality of drive circuits.

An imaging apparatus according to an aspect of the present disclosure includes: the solid-state imaging device; and a signal processing circuit that generates a depth image or a brightness image based on a signal received by the solid-state imaging device.

Advantageous Effects

According to the present disclosure, high measurement accuracy can be achieved by reducing a difference in delay of a drive signal for each column without calibration.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 5 is a flowchart illustrating exposure operation in Embodiment 1.

DESCRIPTION OF EMBODIMENTS

The following describes embodiments with reference to the drawings. Note that the embodiments below are essentially preferable examples, and are not intended to limit the scope of the present disclosure, products to which the present disclosure is applied, or the applications of the present disclosure. Note that elements having the same numerals perform equivalent operations, and thus a redundant description is omitted.

Embodiment 1

[1. Configuration of Imaging Apparatus 1000]

Figure 1:
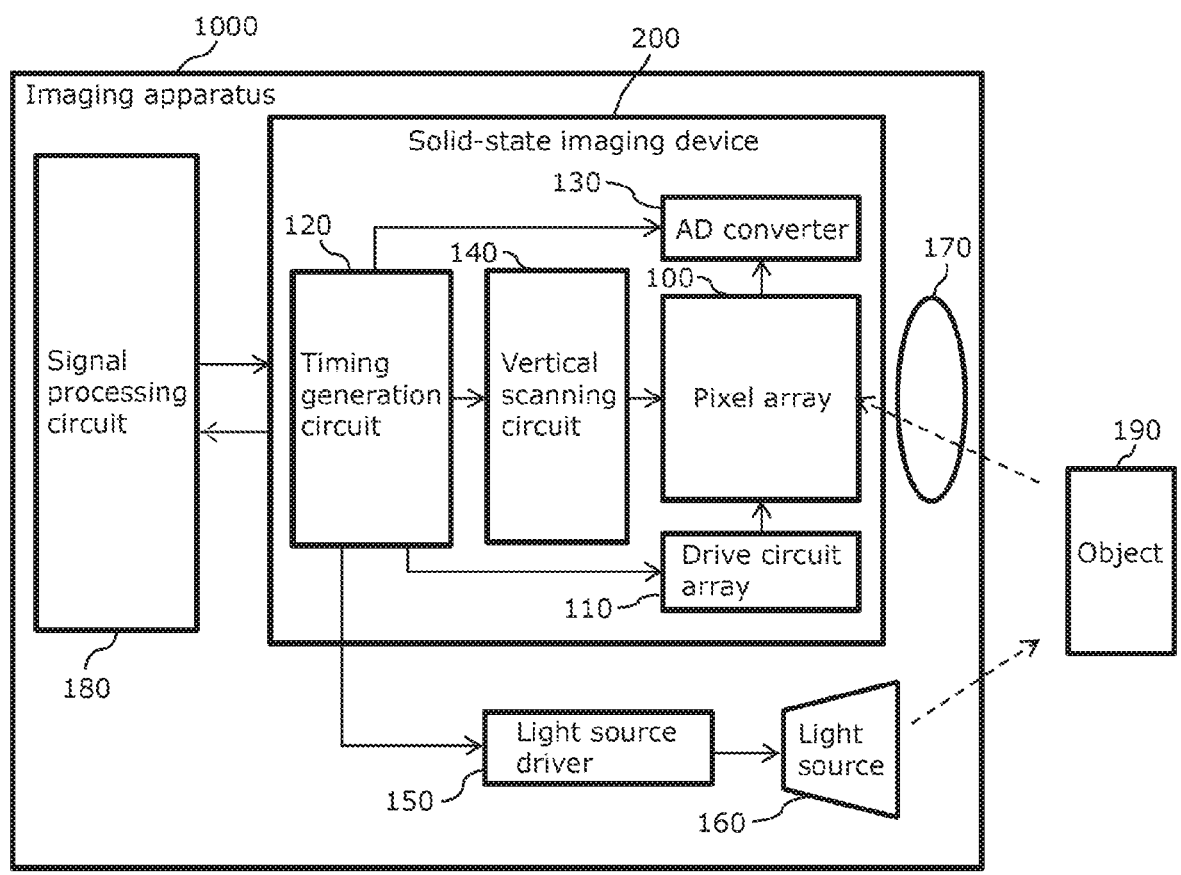
FIG. 1 is a block diagram illustrating an example of a configuration of an imaging apparatus according to Embodiment 1.

FIG. 1 is a block diagram illustrating an example of a configuration of imaging apparatus 1000 according to Embodiment 1. FIG. 1 also illustrates object 190 that is a distance measurement target.

As illustrated in FIG. 1, image capturing device 1000 includes light source driver 150, light source 160, optical lens 170, signal processing circuit 180, and solid-state imaging device 200. Solid-state imaging device 200 includes pixel array 100, drive circuit array 110, timing generation circuit 120, analog-to-digital (AD) converter 130, and vertical scanning circuit 140.

Light source driver 150 supplies light source 160 with a drive signal, according to a signal that gives an instruction for light emission from timing generation circuit 120.

Light source 160 generates pulsed light for distance measurement according to the drive signal from light source driver 150.

Lens 170 is for collecting reflected pulsed light from object 190, which corresponds to pulsed light from light source 160.

Signal processing circuit 180 obtains a distance to object 190 by calculation, based on a signal received from solid-state imaging device 200.

Pixel array 100 includes a plurality of pixels disposed in a matrix on a semiconductor substrate. In the following, pixels aligned in a row direction are referred to as a pixel row, out of the plurality of pixels. In addition, pixels aligned in a column direction are referred to as a pixel column.

Drive circuit array 110 includes aligned drive circuits provided for pixel columns, and supplies pixel array 100 with control signals for controlling signal charge generated in the pixels.

Timing generation circuit 120 generates an emission signal that gives an instruction for light emission to object 190 (here, an example of emission of near infrared light is shown). An emission signal drives light source 160 via light source driver 150. At this time, timing generation circuit 120 generates an exposure signal that gives an instruction for pixel array 100 to be exposed to reflected light from object 190. For example, timing generation circuit 120 generates an exposure signal for multiple times within one frame period, to cause each pixel to store a pixel signal corresponding to a total amount of exposure for the multiple times.

AD converter 130 converts an analog pixel signal output from each pixel row of pixel array 100 into a digital pixel signal.

Vertical scanning circuit 140 sequentially scans pixel rows of pixel array 100, to cause each pixel row to output a pixel signal to AD converter 130.

Solid-state imaging device 200 causes light source 160 to emit near infrared light to object 190 in background light, as illustrated in FIG. 1. Reflected light from object 190 enters pixel array 100 through optical lens 170. The reflected light that enters pixel array 100 forms an optical image, and the optical image is converted into pixel signals. Output from solid-state imaging device 200 is converted into distance data by signal processing circuit 180, and is converted into a visible depth image or brightness image according to its application.

Note that signal processing circuit 180 is not necessarily provided outside solid-state imaging device 200, and some or all the functions for calculating a distance, for instance, may be provided in solid-state imaging device 200.

Examples of solid-state imaging device 200 include a so-called CMOS image sensor.

[1.1 Configuration of Solid-State Imaging Device 200]

Figure 2:
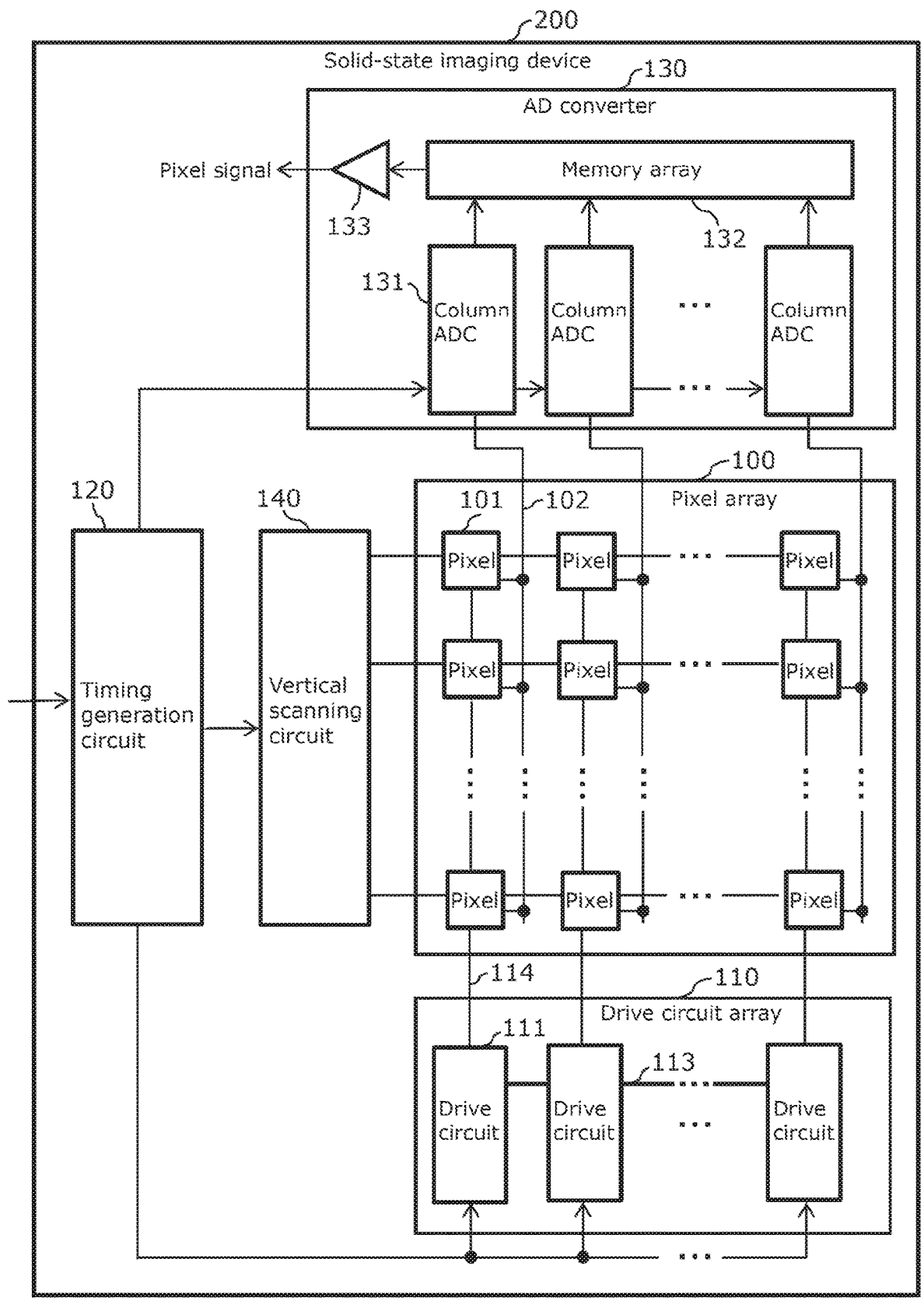
FIG. 2 is a block diagram illustrating an example of a detailed configuration of a solid-state imaging device according to Embodiment 1.

FIG. 2 is a block diagram illustrating an example of a detailed configuration of solid-state imaging device 200 according to Embodiment 1. Solid-state imaging device 200 includes pixel array 100, drive circuit array 110, timing generation circuit 120, and AD converter 130.

Pixel array 100 includes pixels 101 disposed in a matrix. Here, pixels 101 are unit elements each provided with, as necessary, a device structure for reading a signal generated through photoelectric conversion such as: a light-sensitive element such as a photodiode or a photogate; a photoelectric conversion film that includes amorphous silicon; or an organic photoelectric conversion film, and a structure that allows an initial operation to be performed. Such pixels are examples of sensitive pixels, and pixel array 100 is an example of a sensitive element array.

Drive circuit array 110 includes one or more drive circuits 111 provided for the pixel columns, and first wire 113. Drive circuit array 110 controls storage and discharge of charge in and from pixels 101.

Drive circuits 111 output control signals having the same phase in order to implement a global shutter. Each drive circuit 111 applies a drive pulse as a control signal to each electrode of pixels 101 through electrode drive wire 114 as a control wire for controlling pixels. Electrode drive wire 114 includes one or more control wires. More specifically, each drive circuit 111 supplies pixel array 100 with control signals for controlling resetting and reading signal charge generated in pixels 101 in a pixel column for which the drive circuit is provided. The control signals control simultaneous operation of all pixels 101 in order to implement a global shutter. In the following, a wire for conveying control signals and signals indicating drive pulses output from drive circuit array 110 is referred to as electrode drive wire 114. Note that at least one drive circuit 111 is provided for each pixel column. The number of drive circuits 111 for one pixel column depends on the configuration of pixels 101. In addition, the above "reading" in response to a control signal stated above means transfer of signal charge in pixel 101, and means, for example, transfer (or reading) of signal charge from a photodiode to a floating diffusion layer.

First wire 113 short-circuits signal wires through which control signals having the same phase are conveyed, in two or more drive circuits 111 out of plural drive circuits 111. The signal wires short-circuited by first wire 113 have averaged delayed times, as compared to the case when the signal wires are not short-circuited. Thus, a difference in delay time between short-circuited drive circuits 111 can be reduced while calibration described in relation to a conventional technology is unnecessary. In addition, a circuit for calibration is unnecessary, and thus a circuit scale can be reduced.

Note that examples of two or more drive circuits 111 may include a group of drive circuits 111 for even-numbered pixel columns, a group of drive circuits 111 for odd-numbered pixel columns, and a group of drive circuits 111 that operate in a pixel-thinned operation mode.

Timing generation circuit 120 generates an emission signal and an exposure signal already described, based on an instruction from signal processing circuit 180.

AD converter 130 includes column analog-digital converters (ADCs) 131 provided for the pixel columns, memory array 132, and output circuit 133.

Each column ADC 131 is provided for one column or plural columns of pixels 101, and converts analog pixel signals output from pixels 101 through vertical signal wire 102 into digital pixel signals. FIG. 2 illustrates an example in which each column ADC 131 is provided for one column. The digital pixel signals are transferred to memory array 132, and sequentially output to signal processing circuit 180 as pixel signals through output circuit 133.

Vertical scanning circuit 140 sequentially scans pixel columns of pixel array 100 as units, and reads and initializes pixel signals. The read pixel signals are transmitted to column ADCs 131 through vertical signal wires 102 provided for the columns, and converted into digital signals.

[1.2 Configuration of Pixel 101]

Figure 3:
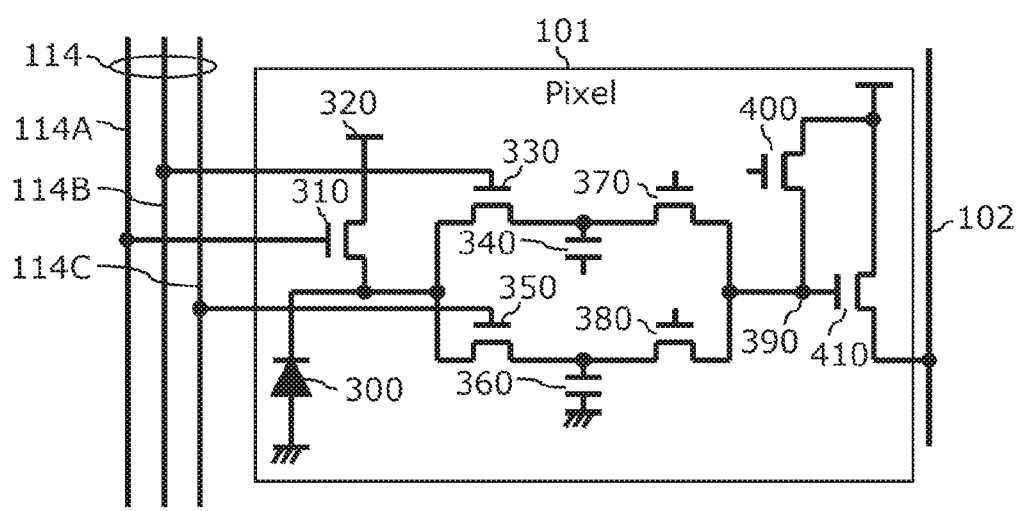
FIG. 3 illustrates an example of a configuration of a pixel and an example of a configuration of an electrode drive wire according to Embodiment 1.

FIG. 3 illustrates an example of a configuration of pixel 101 and an example of a configuration of electrode drive wire 114.

Pixel 101 includes photoelectric converter 300, reset electrode 310, first read electrode 330, second read electrode 350, first charge storage 340, second charge storage 360, first selection transistor 370, second selection transistor 380, floating diffusion layer 390, reset transistor 400, and source follower 410.

Photoelectric converter 300 converts light into charge, and stores the charge.

Reset electrode 310 is a gate electrode of a reset transistor that connects charge discharger 320 and photoelectric converter 300.

First read electrode 330 is a gate electrode of a first transfer transistor that reads charge from photoelectric converter 300 to first charge storage 340.

Second read electrode 350 is a gate electrode of a second transfer transistor that reads charge from photoelectric converter 300 to second charge storage 360.

First charge storage 340 is a capacitor or a diffusion layer that holds charge read from photoelectric converter 300.

Second charge storage 360 is a capacitor or a diffusion layer that holds charge read from photoelectric converter 300.

First selection transistor 370 connects first charge storage 340 and the gate electrode of source follower 410, according to control by a first selection signal. A first selection signal is supplied from vertical scanning circuit 140 to the gate electrode of first selection transistor 370.

Second selection transistor 380 connects second charge storage 360 and the gate electrode of source follower 410, according to control by a second selection signal. A second selection signal is supplied from vertical scanning circuit 140 to the gate electrode of second selection transistor 380.

Floating diffusion layer 390 holds charge transferred from first charge storage 340 through first selection transistor 370, and holds charge transferred from second charge storage 360 through second selection transistor 380.

Reset transistor 400 resets floating diffusion layer 390 according to a reset signal. A reset signal is supplied from vertical scanning circuit 140 to the gate electrode of reset transistor 400.

Source follower 410 converts charge held in floating diffusion layer 390 into voltage, and outputs the voltage to vertical signal wire 102.

Electrode drive wire 114 includes reset control wire 114A, first read control wire 114B, and second read control wire 114C.

When a drive pulse is applied to reset electrode 310 through reset control wire 114A, charge stored in photoelectric converter 300 is discharged to charge discharger 320.

When a drive pulse is applied to first read electrode 330 through first read control wire 114B, charge stored in photoelectric converter 300 is transferred to first charge storage 340.

When a drive pulse is applied to second read electrode 350 through second read control wire 114C, charge stored in photoelectric converter 300 is transferred to second charge storage 360.

[1.3 Configuration of Drive Circuit Array 110]

Figure 4A:
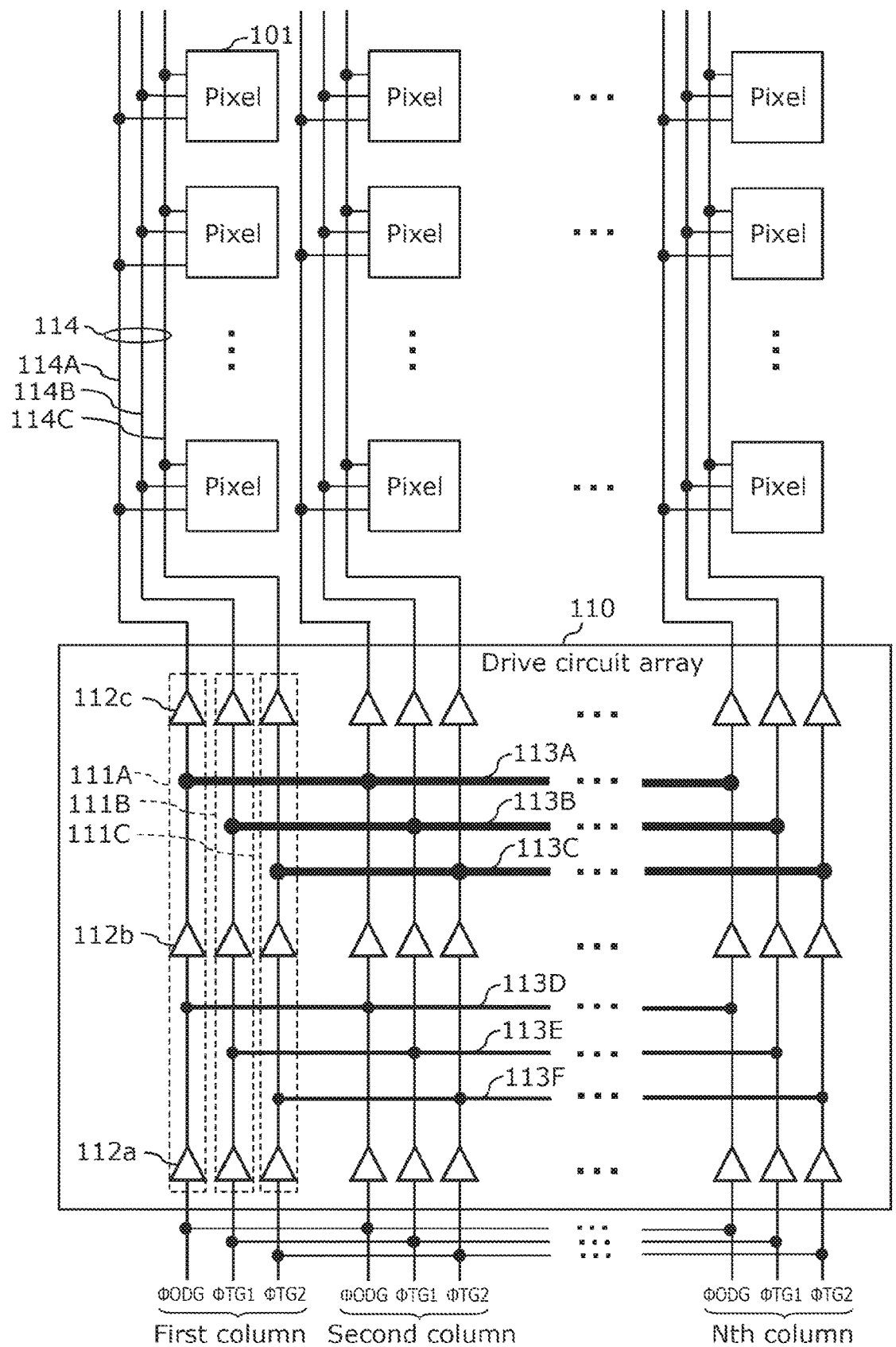
FIG. 4A illustrates an example of a detailed configuration of a pixel array and an example of a detailed configuration of a driver circuit array according to Embodiment 1.

FIG. 4A illustrates an example of a detailed configuration of drive circuit array 110.

Pixel 101 in FIG. 4A has the same configuration as the example illustrated in FIG. 3. It is assumed that as electrode drive wire 114 from drive circuit array 110, reset control wire 114A, first read control wire 114B, and second read control wire 114C are connected to each pixel 101.

Drive circuit array 110 includes three drive circuits 111A to 111C for each pixel column. Three drive circuits 111A to 111C are for reset control wire 114A, first read control wire 114B, and second read control wire 114C, respectively. Note that when it is not necessary to particularly distinguish between drive circuits 111A to 111C, drive circuits 111A to 111C are each simply referred to as drive circuit 111.

A reset control signal having drive pulse ΦODG is input from timing generation circuit 120 to drive circuit 111A for each pixel column. Each drive circuit 111A outputs a reset control signal to reset electrode 310 in each pixel 101 in a corresponding pixel column through reset control wire 114A.

A first read control signal having drive pulse ΦTG1 is input from timing generation circuit 120 to drive circuit 111B for each pixel column. Each drive circuit 111B outputs a first read control signal to first read electrode 330 in each pixel 101 in a corresponding pixel column through first read control wire 114B.

A second read control signal having drive pulse ΦTG2 is input from timing generation circuit 120 to drive circuit 111C for each pixel column. Each drive circuit 111C outputs a second read control signal to second read electrode 350 in each pixel 101 in a corresponding pixel column through second read control wire 114C.

Each drive circuit 111 includes at least two stages of buffer elements 112. Drive circuit 111 in FIG. 4A includes three stages of buffer elements 112a to 112c. Buffer elements 112a to 112c are configured to have drive capability such that buffer element 112a has the highest drive capability, buffer element 112b has the second highest drive capability, and buffer element 112c has the third highest drive capability. Note that the drive capability of buffer element 112 can be increased by increasing the size of a transistor for output in buffer element 112. The drive capability of buffer element 112 can be increased by including transistors for output that are disposed in parallel in buffer element 112.

Note that when buffer elements 112a to 112c are not distinguished in particular, buffer elements 112a to 112c are each simply referred to as buffer element 112. Here, buffer element 112 may be an inverter circuit whose polarity can be inverted or a buffer circuit whose polarity does not change.

First wire 113 includes at least one wire that short-circuits signal wires in two or more drive circuits 111, through which signals having the same phase are conveyed. In FIG. 4A, first wire 113 includes three types of first wires 113A, 113B, and 113C corresponding to reset control wire 114A, first read control wire 114B, and second read control wire 114C. Furthermore, first wire 113 includes three types of first wires 113D, 113E, and 113F corresponding to reset control wire 114A, first read control wire 114B, and second read control wire 114C.

Each of drive circuits 111A drives a reset control signal having the same phase as that of a reset control signal driven by drive circuit 111A in another column, if a difference in delay time is disregarded. Similarly, each of drive circuits 111B in the columns drives a first read control signal having the same phase as that of a first read control signal driven by drive circuit 111B in another column. The same also applies to drive circuit 111C.

First wire 113A short-circuits wires in two or more drive circuits 111A, through which signals having the same phase are conveyed. In FIG. 4A, first wire 113A short-circuits output wires of buffer elements 112b in the second stage in drive circuits 111A. Accordingly, a difference in delay time between the output wires of buffer elements 112b in drive circuits 111A can be averaged.

First wire 113B short-circuits output wires of buffer elements 112b in the second stage in drive circuits 111B. Similarly, first wire 113C short-circuits output wires of buffer elements 112b in the second stage in drive circuits 111C.

First wire 113D short-circuits output wires of buffer elements 112a in the first stage in drive circuits 111A. Accordingly, a difference in delay time between the output wires of buffer elements 112a in drive circuits 111A can be averaged.

First wire 113E short-circuits output wires of buffer elements 112a in the first stage in drive circuits 111B. Similarly, first wire 113F short-circuits output wires of buffer elements 112a in the first stage in drive circuits 111C. The first wires are configured such that the impedance of first wires 113A to 113C is lower than the impedance of first wires 113D to 113F. For example, the width of first wires 113A to 113C may be greater than the width of first wires 113D to 113F. Alternatively, first wires 113D to 113F may each include a single wire, and first wires 113A to 113C may each include parallel lines.

Loads driven by each drive circuit 111 are wire loads and gate loads the number of which is the same as the number of pixels that are driven, and thus are heavy. Thus, buffer elements 112c in the last stage of drive circuits 111 need to have high drive capability. If buffer elements 112c in the last stage are driven directly using drive pulses generated by timing generation circuit 120, loads are too heavy and a long voltage rise time and a long voltage fall time are necessary, which results in a time lag in drive pulse between the columns. Accordingly, in drive circuits 111, buffer elements 112 connected in multiple stages need to have gradually increasing drive capability from the first stage to the last stage. For example, the size of transistors included in buffer elements 112 is gradually increasing from buffer element 112a in the first stage to buffer element 112c in the last stage.

First wire 113 short-circuits output wires of buffer elements 112 that drive signals having the same phase, and reduces a time lag in drive pulse between the columns. Stated differently, first wire 113 is a wire for averaging a delay. A time delay between columns is generated due to manufacturing variations in transistors included in drive circuits 111, a difference in wire resistance and capacity caused by a layout difference, and a difference in power source drop. First wire 113 short-circuits nodes in the drive circuits at low impedance, to change the potentials at the nodes to the same potential. Accordingly, this works to decrease a time lag through first wire 113 even when a time delay occurs between columns of drive circuits 111. In addition, first wire 113 is provided in a horizontal direction of drive circuit array 110, and thus a time lag is decreased in the entire drive circuit array.

Note that if a time lag occurs between columns, a potential difference between the columns is generated, and flow-through current flows through first wire 113. In particular, the longer the time lag is, the greater the potential difference is, resulting in an increase in flow-through current. If a high current flows due to flow-through current, this may lead to melting of a wire and damage of a transistor. In drive circuits 111, there is a longer time lag between columns in buffer element 112 in a downstream stage, thus a time lag is shorter in buffer element 112 in an upstream stage in drive circuits 111. Accordingly, if first wire 113 short-circuits output wires of buffer elements in an upstream stage in drive circuits 111 in columns, a time lag is short, and thus flow-through current through first wire 113 can be decreased.

Plural first wires 113 may be provided, rather than single first wire 113. Single first wire 113 yields an advantageous effect of reducing a time lag, yet there is a longer time lag in buffer element 112 in a downstream stage as mentioned above. Thus, a time lag can be decreased if output wires of buffer elements 112 are short-circuited for each stage. The drive capability of buffer elements 112 in a downstream stage in drive circuits 111 is higher, and thus the impedance of first wire 113 for a downstream stage is lower. The impedance is decreased by, for instance, providing thicker first wire 113 for a downstream stage, through which more flow-through current flows, and thus a wire can be prevented from being melted or cut.

Buffer electrodes 112c in the last stage connected to electrode drive wires 114 have high drive capability, and if they are short-circuited between columns, great flow-through current flows, and thus a wire may be melted and cut and a transistor may be damaged. Accordingly, electrode drive wires 114 are not short-circuited between columns, and are made independent column by column.

Next, another example of a configuration of drive circuit array 110 is to be described.

Figure 4B:
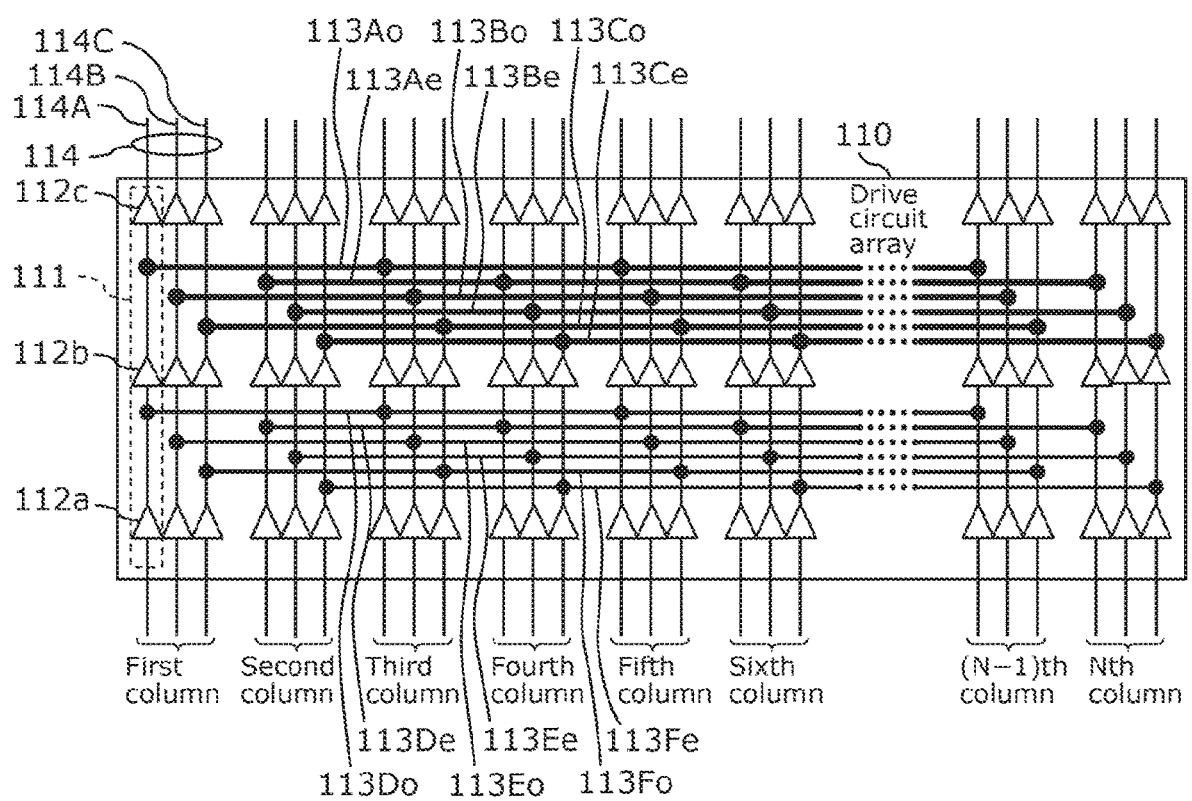
FIG. 4B illustrates another example of a configuration of the drive circuit array according to Embodiment 1.

FIG. 4B illustrates another example of a configuration of drive circuit array 110 according to Embodiment 1. The configuration in FIG. 4B is different from that of drive circuit array 110 in FIG. 4A in that drive circuits 111A to 111C each include M drive circuit groups resulting from being divided into M (M is an integer greater than or equal to 2), first wires 113A to 113C are provided for each of the M drive circuit groups, and short-circuit output wires of buffer elements belonging to the drive circuit group. The following gives a description, focusing on different points.

Plural drive circuits 111A to 111C each include two drive circuit groups resulting from the drive circuits being divided into two. In FIG. 4B, M=2. Specifically, drive circuits 111A are divided into a drive circuit group that includes drive circuits 111 in odd-numbered columns, and a drive circuit group that includes drive circuits 111 in even-numbered columns. Drive circuits 111B are divided into a drive circuit group in odd-numbered columns, and a drive circuit group in even-numbered columns. The same also applies to drive circuits 111C.

First wire 113A in FIG. 4A corresponds to two first wires 113Ao and 113Ae in FIG. 4B. First wire 113Ao short-circuits output wires of buffer elements 112*b* in the drive circuit group in odd-numbered columns. First wire 113Ae short-circuits output wires of buffer elements 112*b* in the drive circuit group in even-numbered columns.

First wire 113B corresponds to first wire 113Bo for odd-numbered columns and first wire 113Be for even-numbered columns.

Similarly, first wire 113C corresponds to first wire 113Co and first wire 113Ce.

First wire 113D in FIG. 4A corresponds to two first wires 113Do and 113De in FIG. 4B. First wire 113Do short-circuits output wires of buffer elements 112*a* in the drive circuit group in odd-numbered columns. First wire 113De short-circuits output wires of buffer elements 112*a* in the drive circuit group in even-numbered columns.

First wire 113E corresponds to first wire 113Eo for odd-numbered columns and first wire 113Ee for even-numbered columns.

Similarly, first wire 113F corresponds to first wire 113Fo and first wire 113Fe.

FIG. 4B illustrates an example in which pixel columns are divided equally into two. In this case, loads of first wires 113 on drive circuit array 110 can be decreased in a pixel-thinned operation mode for generating an image based on pixels, the number of which in the row direction is halved.

Note that dividing into M may not mean dividing equally into M, and M may be three or more. For example, when an image based on pixels, the number of which in the row direction is quartered, is generated, all the pixel columns may be divided into two at 1:3 or may be divided into three at 1:2:1.

[1.4 Operation of Solid-State Imaging Device 200]

Figure 6:
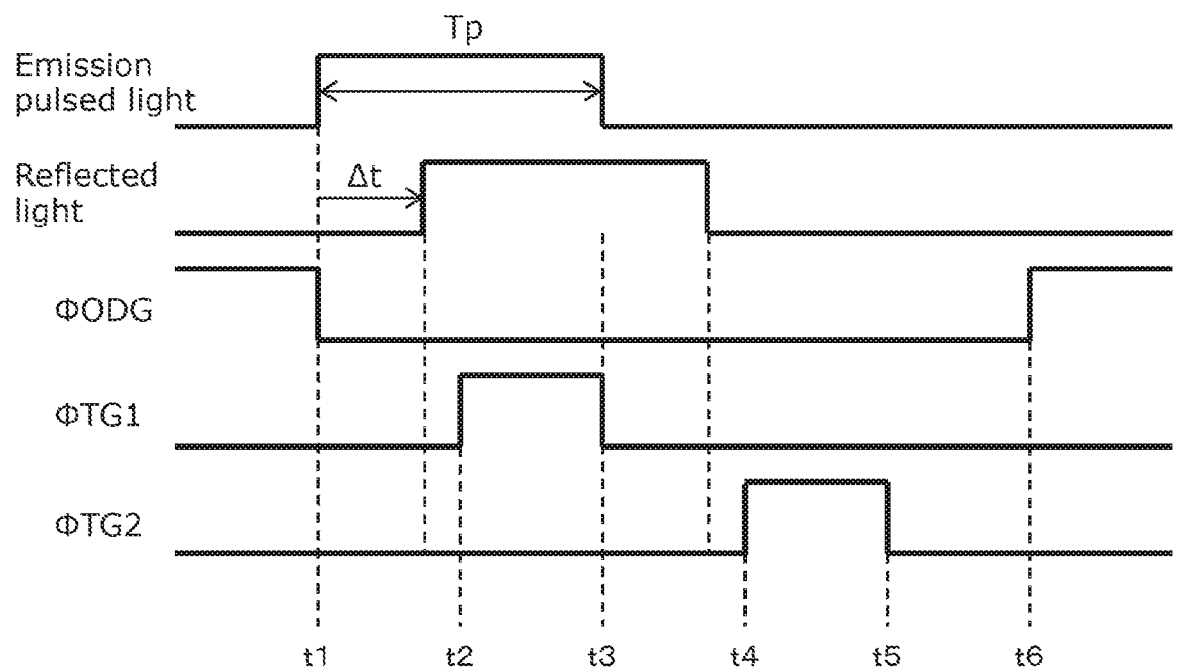
FIG. 6 is a timing chart illustrating drive pulses during exposure operation.

Next, operation of solid-state imaging device 200 during an exposure period is to be described with reference to FIGS. 5 and 6.

FIG. 5 is a flowchart illustrating exposure operation in Embodiment 1. FIG. 6 is a timing chart illustrating drive pulses during exposure operation in Embodiment 1.

First, reset step ST00 is performed as an initial operation immediately before time t1. Drive pulse ΦODG applied to reset electrode 310 is in the high state, and photoelectric converter 300 is in the reset state. Drive pulse ΦTG1 applied to first read electrode 330 and drive pulse ΦTG2 applied to second read electrode 350 are in the low state, and photoelectric converter 300, first charge storage 340, and second charge storage 360 are electrically isolated. In this state, signal charge generated in photoelectric converter 300 is discharged to charge discharger 320 through reset electrode 310, and is not stored in photoelectric converter 300.

Next, the processing proceeds to light storage start step ST01 at time t1. When reset electrode 310 is placed in the low state, and discharge of charge from photoelectric converter 300 to charge discharger 320 is stopped. Photoelectric converter 300 is placed in a state for storing generated signal charge. At the same time, timing generation circuit 120 applies a light-emission trigger signal to light source driver 150, and light source 160 emits infrared pulsed light (emission pulsed light). After emitting infrared pulsed light, reflected light enters pixel array 100 with a time difference according to a distance to object 190.

Next, the processing proceeds to first read step ST02 at time t2. First read electrode 330 is placed in the high state, and photoelectric converter 300 and first charge storage 340 are electrically connected. The signal charge stored in photoelectric converter 300 is transferred to first charge storage 340.

Next, first read electrode 330 is placed in the low state at time t3, photoelectric converter 300 and first charge storage 340 are electrically isolated, and reading signal charge S0 is completed. At the same time, timing generation circuit 120 applies a trigger signal to light source driver 150, and light source 160 stops emitting infrared pulsed light. Signal charge S0 is an amount of charge in proportion to time (Tp−Tf) obtained by subtracting reach time Tf taken by reflected light to reach pixel array 100 after infrared pulsed light is emitted from emission time Tp of infrared pulsed light.

Next, the processing proceeds to second read step ST03 at time t4. Second read electrode 350 is placed in the high state, and photoelectric converter 300 and second charge storage 360 are electrically connected. The signal charge stored in photoelectric converter 300 is transferred to second charge storage 360.

Next, second read electrode 350 is placed in the low state at time t5, photoelectric converter 300 and second charge storage 360 are electrically isolated, and reading signal charge S1 is completed. Signal charge S1 is an amount of charge in proportion to reach time Tf.

Next, the processing proceeds to reset step ST04 at time t6. Reset electrode 310 is placed in the high state, photoelectric converter 300 and charge discharger 320 are electrically connected, and photoelectric converter 300 is placed in the reset state, thus achieving a state in which charge is not stored in photoelectric converter 300.

When exposure is repeated, the processing proceeds to emission accumulation start step ST01 again, and operation from emission accumulation start step ST01 to reset step ST04 is repeated. Operation from emission accumulation start step ST01 to reset step ST04 is performed multiple times within a single frame period, and signal charge S0 and signal charge S1 according to a total amount of exposure for the multiple times are stored in first charge storage 340 and second charge storage 360, respectively. After repetition of exposure ends, exposure is completed.

After the exposure period ends, first select transistor 370 is placed in the high state, and reading signal charge S0 starts. Signal charge S0 is transferred to floating diffusion layer 390, and is converted into a voltage in source follower 410. Signal charge S0 converted into a voltage is converted into a digital signal in column ADC 131 through vertical signal wire 102. When reading signal charge S0 is completed, reset transistor 400 is placed in the high state, and floating diffusion layer 390 is reset to the initial state. Pixel array 100 is sequentially scanned in the vertical direction, and signal charges S0 of all pixels 101 are converted into digital signals.

Next, after first select transistor 370 is placed back into the low state, second select transistor 380 is placed in the high state, and reading signal charge S1 starts. Signal charge S1 is transferred to floating diffusion layer 390 similarly to signal charge S0, and is converted into a voltage in source follower 410. Signal charge S1 converted into a voltage is converted into a digital signal in column ADC 131 through vertical signal wire 102. When reading signal charge S1 is completed, reset transistor 400 is placed in the high state, and floating diffusion layer 390 is reset to the initial state. Pixel array 100 is sequentially scanned in the vertical direction, and signal charges S1 of all pixels 101 are converted into digital signals.

Here, distance Z from imaging apparatus 1000 to object 190 can be obtained from reach time Tf by using Expression (1) below, where the speed of light is c.

[Math 1]

$$Z = c\frac{Tf}{2} \quad (1)$$

Signal charge S0 is an amount of charge in proportion to Tp−Tf resulting from subtracting reach time Tf from emission time Tp, and signal charge S1 is an amount of charge in proportion to reach time Tf, and thus ratio S1/S0 of signal charges is equal to ratio Tf/(Tp−Tf) of the reach time and the emission time. Reach time Tf is obtained as follows by Expressions (2a) and (2b) below, based on emission time Tp and signal charges S1 and S0.

[Math 2]

$$\frac{S1}{S0} = \frac{Tf}{Tp - Tf} \quad (2a)$$

$$Tf = \frac{S1}{S0 + S1}Tp \quad (2b)$$

Thus, distance Z to object 190 is obtained by Expression (3) below, based on signal charges S0 and S1 and emission time Tp.

[Math 3]

$$Z = \frac{c}{2}\left(\frac{S1}{S0 + S1}\right)Tp \quad (3)$$

If first wire 113 is not provided, a time lag occurs between columns. If there is time lag Δt, signal charge S1 is proportional to Tf−Δt resulting from subtracting time lag Δt from reach time Tf, whereas signal charge S0 is proportional to Tp−Tf+Δt resulting from adding time lag Δt to the result of Tp−Tf resulting from subtracting reach time Tf from emission time Tp. Thus, ratio S1/S0 of signal charges is obtained by Expressions (4a) and (4b) below.

[Math 4]

$$\frac{S1}{S0} = \frac{Tf - \Delta t}{Tp - Tf + \Delta t} \quad (4a)$$

$$Tf = \frac{S1}{S0 + S1}Tp + \Delta t \quad (4b)$$

Since time lag Δt is added to actual reach time Tf, measurement distance difference ΔZ is generated in distance Z to object 190, as shown by Expression (5) below.

[Math 5]

$$\Delta Z = \frac{c}{2}\Delta t \quad (5)$$

As an example, measurement distance difference ΔZ generated is about 15 mm when the speed of light is c=299,792,458 m/s and a time lag is Δt=100 ps. By using first wire 113, time lag Δt between columns can be reduced, and measurement distance difference ΔZ can be reduced. As a result, high measurement accuracy can be achieved without calibration or increasing circuit scale.

[1.5 Variation of Solid-State Imaging Device 200]

Next, a variation of solid-state imaging device 200 is to be described.

Figure 4C:
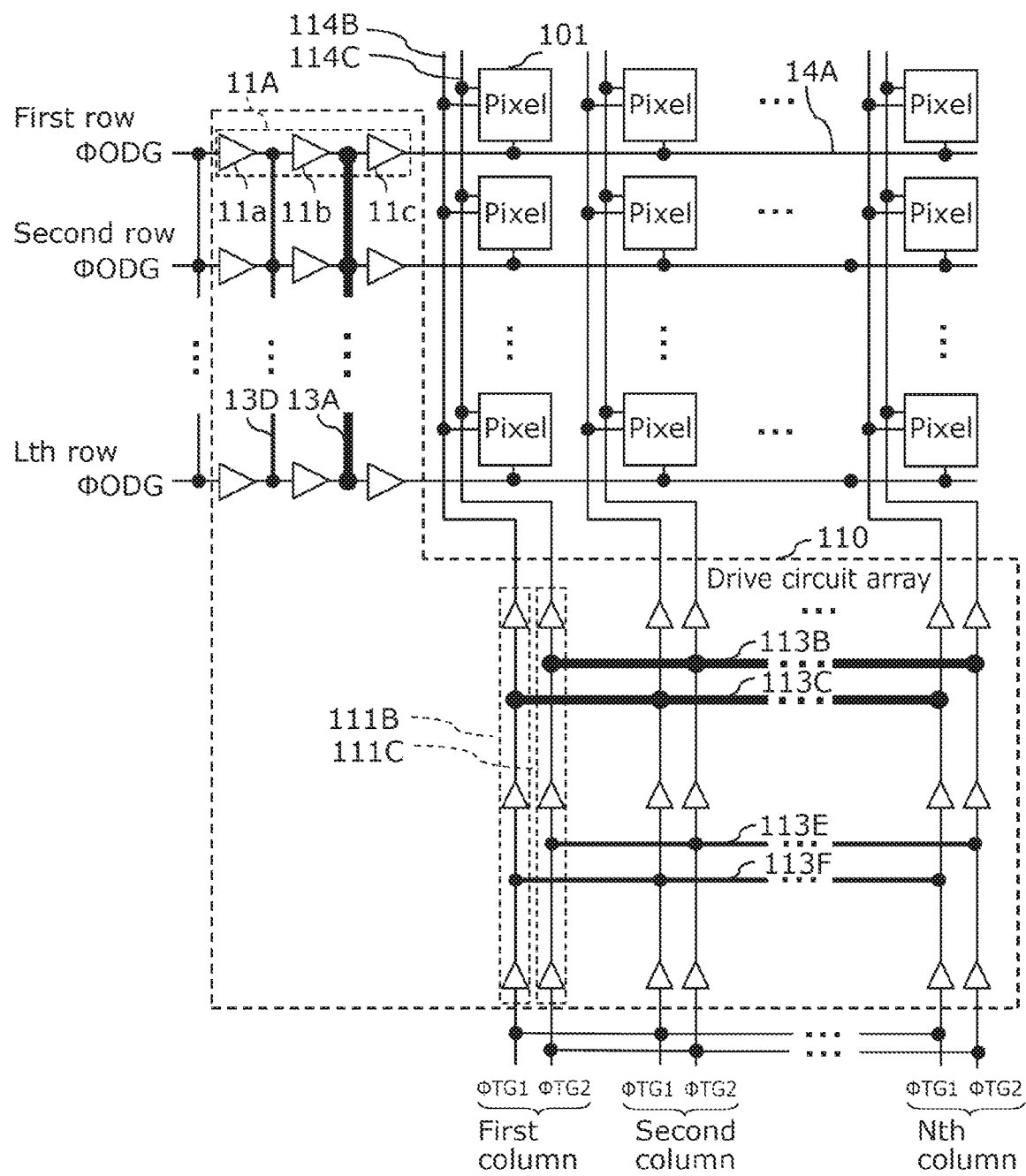
FIG. 4C illustrates a variation of the pixel array and a variation of the driver circuit array according to Embodiment 1.

FIG. 4C illustrates a variation of the pixel array and a variation of the drive circuit array according to Embodiment 1. Drive circuit array 110 in FIG. 4C is different from the drive circuit array in FIG. 4A in that reset control wires 14A for pixel rows are provided instead of reset control wires 114A for pixel columns, drive circuits 11A for pixel rows are provided instead of drive circuits 111A for pixel columns, first wire 13A is provided instead of first wire 113A, and first wire 13D is provided instead of first wire 113D. In the following, a redundant description for the same point is avoided, and different points are mainly described.

Reset control wires 14A are provided for pixel rows, and each transfer a reset control signal having drive pulse ΦODG output from vertical scanning circuit 140 through drive circuit 11A to pixels 101 in the pixel row for which reset control wire 14A is provided.

Drive circuit 11A is provided for each pixel row and in the last stage in vertical scanning circuit 140. Each drive circuit 11A outputs a reset control signal to reset electrode 310 in each pixel 101 in a corresponding pixel row through reset control wire 14A. Note that drive circuit 11A may be provided between vertical scanning circuit 140 and pixel array 100.

Each drive circuit 11A includes at least two stages of buffer elements 11. Drive circuit 11A in FIG. 4C includes buffer elements 11a to 11c in three stages. Buffer elements 11a to 11c are configured to have drive capability such that buffer element 11a has the highest drive capability, buffer element 11b has the second highest drive capability, and buffer element 11c has the third highest drive capability. Note that when buffer elements 11a to 11c are not distinguished in particular, buffer elements 11a to 11c are each simply referred to as buffer element 11. Here, buffer element 11 may be an inverter circuit whose polarity can be inverted or a buffer circuit whose polarity is not changed.

First wire 13A is a type of the first wire, and includes at least one wire that short-circuits signal wires in two or more drive circuits 11, through which signals having the same phase are conveyed.

First wire 13D is a type of the first wire, and includes at least one wire that short-circuits signal wires in two or more drive circuits 11, through which signals having the same phase are conveyed. When first wire 13A and first wire 13D are not distinguished in particular, first wire 13A and first wire 13D are each simply referred to as first wire 13.

Each of drive circuits 11A drives a reset control signal having the same phase as that of drive circuit 11A in another column, if a difference in delay time is disregarded.

First wire 13A short-circuits wires in two or more drive circuits 11A, through which signals having the same phase are conveyed. In FIG. 4C, first wire 13A short-circuits output wires of buffer elements 11b in the second stage in drive circuits 11A. Accordingly, a difference in delay time between the output wires of buffer elements 11b in drive circuits 11A can be averaged.

First wire 13D short-circuits output wires of buffer elements 11a in the first stage in drive circuits 11A. Accordingly, a difference in delay time between the output wires of buffer elements 11a in drive circuits 11A can be averaged.

The first wires are configured such that the impedance of first wire 13A is lower than the impedance of first wire 13D. For example, the width of first wire 13A may be greater than the width of first wire 13D. Alternatively, first wire 13D may include a single wire, and first wire 13A may include parallel lines.

Loads driven by each drive circuit 11A are wire loads and gate loads the number of which is the same as the number of pixels that are driven, and thus are heavy. Thus, buffer elements 11c in the last stage of drive circuits 11A need to have high drive capability. If buffer elements 11c in the last stage are driven directly using drive pulses generated by timing generation circuit 120, loads are too heavy and a long voltage rise time and a long voltage fall time are necessary, which results in a time lag in drive pulse between columns. Accordingly, in drive circuits 11A, connected buffer elements 11 in multiple stages need to have gradually increasing drive capability from the first stage to the last stage. For example, the size of transistors included in buffer elements 11 gradually increases from buffer element 11a in the first stage to buffer element 11c in the last stage.

First wire 13 short-circuits output wires of buffer elements 11 that drive signals having the same phase, and reduces a time lag in drive pulse between columns. Stated differently, first wire 13 is a wire for averaging a delay. A time delay between columns is generated due to manufacturing variations in transistors included in drive circuits 11, a difference in wire resistance and capacity caused by a layout difference, and a difference in power source drop. First wire 13 short-circuits nodes in the drive circuits at low impedance, to change the potentials at the nodes to the same potential. Accordingly, this works to decrease a time lag with use of first wire 13A even when a time delay occurs between columns of drive circuits 11A. In addition, first wire 13 is provided in a vertical direction of drive circuit array 110, and thus a time lag is decreased in entire drive circuit array 110.

As described above, solid-state imaging device 200 according to the present embodiment includes: plural pixels 101 disposed in a matrix of pixel rows and pixel columns; plural control wires 114 provided for the pixel rows or the pixel columns, and each connected to at least two pixels 101 out of plural pixels 101, at least two pixels 101 being included in one of the pixel rows or the pixel columns for which control wire 114 is provided; plural drive circuits 111 that are provided for plural control wires 114, each include buffer elements 112a to 112c in at least two stages, and each output a control signal to one of plural control wires 114 for which drive circuit 111 is provided, the buffer elements in the at least two stages being connected in series; and first wire 113 that short-circuits output wires of buffer elements 112 in one of the at least two stages in at least two of plural drive circuits 111.

According to this, a difference in delay that is a time lag of control signals for each control wire 114, by first wire 113 causing a short-circuit. Thus, high measurement accuracy can be achieved by reducing a difference in delay of a control signal for each column without calibration.

Here, first wire 113 averages delays of at least two of plural control wires 114 that occur in at least two of the pixel rows or at least two of the pixel columns.

Here plural pixels 101 may include optical black pixels and normal pixels that are not the optical black pixels, and first wire 113 has a length longer than a side out of four sides that define an effective region constituted by the normal pixels, the side extending parallel to first wire 113.

According to this, the first wire can be connected to output wires of buffer elements 112 in arbitrary pixel columns out of all the pixel columns.

Here, plural drive circuits 111 may include M drive circuit groups into which plural drive circuits 111 are divided, M being an integer greater than or equal to 2. First wire 113 may be provided for each of the M drive circuit groups, and short-circuit output wires of buffer elements 112 in the M drive circuit group.

This is suitable to generate an image having fewer pixels than all the pixels, using pixel columns for which the drive circuit group is provided, for example.

Here, one of the M drive circuit groups may consist of one or more drive circuits 111 that operate in a pixel-thinned operation mode.

According to this, for example, when, for instance, a low-resolution image is generated, in a pixel-thinned operation mode in which one mth of all the pixel columns (m is an integer greater than or equal to 2) are used and pixel columns other than those pixel columns are not used, necessary drive circuits 111 only can be short-circuited by the first wire. Accordingly, parasitic capacitance of the first wire can be reduced, and the pixel-thinned operation mode can be executed at higher speed.

Here, first wire 113 may be provided for each of the at least two stages of buffer elements 112, excluding a most upstream stage.

Here, first wire 113 provided for buffer elements 112 in one stage out of buffer elements 112 in the at least two stages may have impedance lower than impedance of first wire 113 provided for buffer elements in a stage upstream from the one stage out of buffer elements 112 in the at least two stages.

According to this, the occurrence of the above difference in delay time can be further reduced.

Here, first wire 113 provided for buffer elements 112 in one stage out of buffer elements 112 in the at least two stages may have a width greater than a width of first wire 113 provided for buffer elements 112 in a stage upstream from the one stage out of buffer elements 112 in the at least two stages.

According to this, the occurrence of the above difference in delay time can be further reduced.

Here, buffer elements 112 in one stage out of buffer elements 112 in the at least two stages may have drive capability higher than drive capability of buffer elements 112 in a stage upstream from the one stage out of buffer elements 112 in the at least two stages.

According to this, the occurrence of the above difference in delay time can be further reduced.

Here, plural pixels 101 may each include photoelectric converter 300 that converts light into charge, and read electrode 330/350 for reading the charge from photoelectric converter 300, and plural control wires 114 may be each connected to read electrode 330/350 in each of at least two pixels 101.

Here, plural pixels 101 may each include reset electrode 310 for resetting charge in pixel 101, and plural control wires 114 may each be connected to reset electrode 310 in each of at least two pixels 101.

Here, plural pixels 101 may each include photoelectric converter 300 that converts light into charge, first read electrode 330 for reading the charge from photoelectric converter 300, and reset electrode 310 for resetting the charge in pixel 101. Plural control wires 114 provided for the pixel columns may each include first read control wire 114B connected to first read electrode 330 in each of at least two pixels 101, and reset control wire 114A connected to reset electrode 310 in each of at least two pixels 101. Solid-state imaging device 200 may include, for each of the pixel columns, drive circuit 111B connected to first read control wire 114B, and drive circuit 111A connected to reset control wire 114A, drive circuit 111B and drive circuit 111A being included in plural drive circuits 111.

Here, plural pixels 101 may each further include second read electrode 350 for reading the charge from photoelectric converter 300. Plurality control wires 114 provided for the pixel columns may each further include second read control wire 114C connected to second read electrode 350 in each of at least two pixels 101. Solid-state imaging device 200 may further include, for each of the pixel columns, drive circuit 111C connected to second read control wire 114C, drive circuit 111C being included in plural drive circuits 111.

The imaging apparatus according to Embodiment 1 includes solid-state imaging device 200 described above, and signal processing circuit 180 that generates a depth image or a brightness image based on a signal received by solid-state imaging device 200.

Note that the first wire that short-circuits output wires of corresponding buffer elements 112 in any of the stages may include not only a single wire, but also two or more wires connected in parallel. Two or more first wires 113 connected in parallel may be formed in a single wiring layer, or may be formed in a plurality of wiring layers.

Embodiment 2

[2. Configuration of Drive Circuit Array 110]

Figure 7:
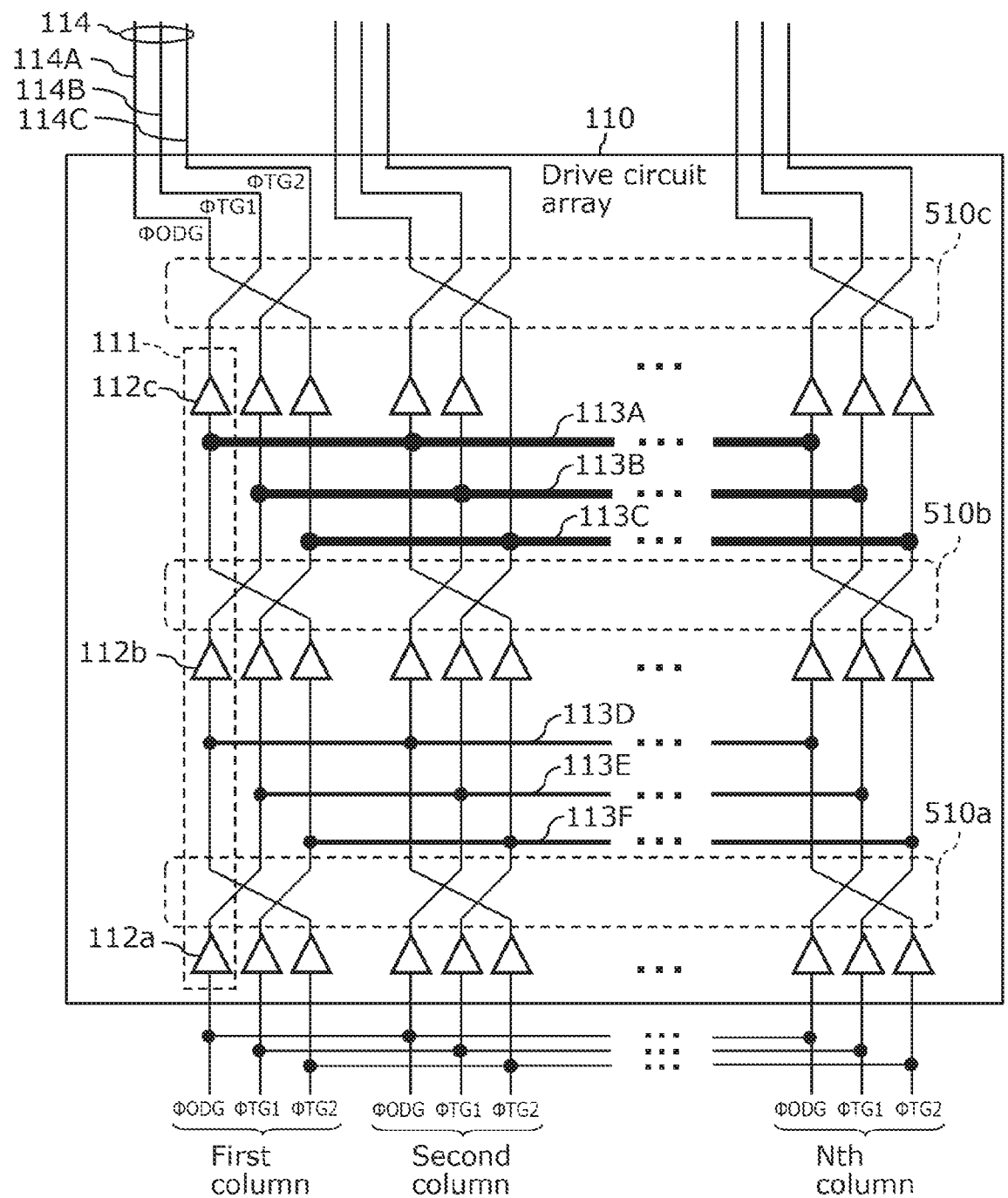
FIG. 7 illustrates details of a drive circuit array according to Embodiment 2.

FIG. 7 illustrates a configuration of drive circuit array 110 according to Embodiment 2. As illustrated in FIG. 7, drive circuit array 110 in Embodiment 2 is different from drive circuit array 110 in FIG. 4A in that wire swappers 510a to 510c are additionally included. The following description focuses on different points. Note that when wire swappers 510a to 510c are not distinguished in particular, wire swappers 510a to 510c are each simply referred to as wire swapper 510.

Wire swappers 510a to 510c each connect an output wire of buffer element 112 in drive circuit 111 to buffer element 112 that is not in the same column but in the same stage, and thus swap wires in drive circuit 111 in different columns. In other words, wire swappers 510a to 510c each cause wires in plural drive circuits 111 to cross, to substantially swap between buffer elements 112 in a same stage in plural drive circuits 111, out of buffer elements 112 in the at least two stages in each of plural drive circuits 111.

Although FIG. 7 illustrates an example in which wire swappers 510a to 510c are provided at three locations, wire swappers may be provided at two locations or four or more locations. In addition, FIG. 7 illustrates an example in which wires are swapped between adjacent drive circuits 111 provided for the same pixel column, yet wires may be swapped between drive circuits 111 that are not adjacent to each other.

The exposure operation in Embodiment 2 is performed following the steps in FIG. 5, similarly to Embodiment 1.

As described above, in the solid-state imaging device according to the present embodiment, with regard to a difference between columns of drive circuits 111 due to a difference in layout and manufacturing variations, by swapping paths through which drive signals pass, delay times of drive signals that differ for the columns can be averaged so that a difference in delay time between columns can be reduced. In particular, it is effective in reducing a difference in delay time between columns when drive signals have different phases and first wire 113 cannot short-circuits the columns. As a result, a delay difference in drive signals having different phases can be reduced, and measurement accuracy can be enhanced.

As described above, solid-state imaging device 200 according to Embodiment 2 may further include: wire swapper 510 that causes wires in plural drive circuits 111 to cross, to substantially swap between buffer elements 112 in a same stage in plural drive circuits 111, out of buffer elements 112 in the at least two stages in each of plural drive circuits 111.

Here, two or more wire swappers 510 may be provided, two or more wire swappers 510 each being wire swapper 510. Each of two or more wire swappers 510 may be provided at input wires or output wires of buffer elements 112 in the at least two stages in plural drive circuits 111.

Embodiment 3

[3. Configuration of Drive Circuit Array 110]

Figure 8:
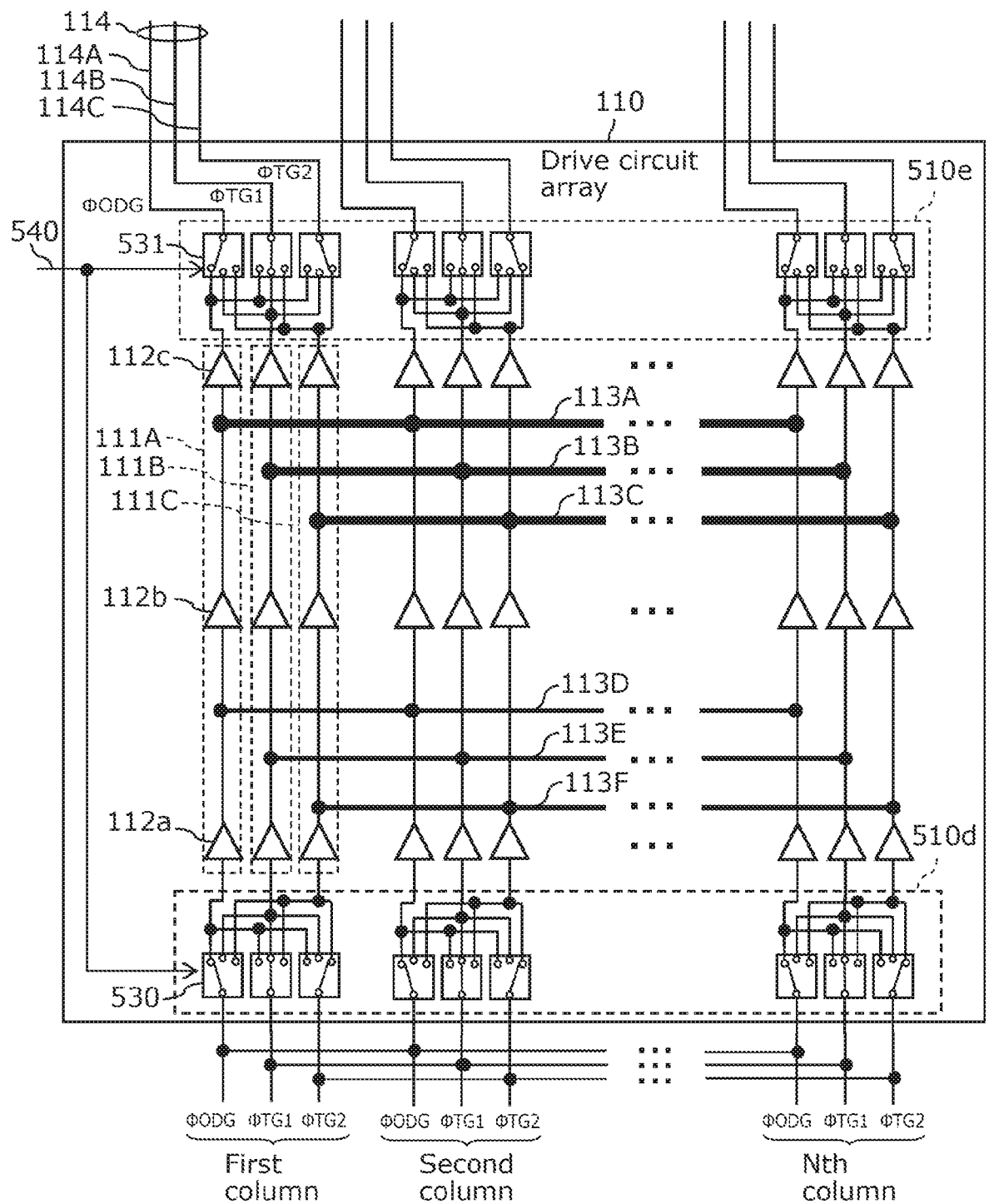
FIG. 8 illustrates details of a drive circuit array according to Embodiment 3.

FIG. 8 illustrates a configuration of drive circuit array 110 according to Embodiment 3. As illustrated in FIG. 8, wire swappers 510 in Embodiment 3 are different from the wire swappers in FIG. 7 in that wire swappers 510d and 510e are provided instead of wire swappers 510a to 510c. The following description focuses on different points. Note that when wire swappers 510d and 510e are not distinguished in particular, wire swappers 510d and 510e are each simply referred to as wire swapper 510.

Wire swapper 510d includes three selection circuits 530 for each pixel column. Selection circuits 530 each include one input terminal and three output terminals, select one of the output terminals, and connect the input terminal to the selected output terminal. Three selection circuits 530 for one pixel column each swap an input wire of buffer element 112a in a corresponding one of three drive circuits 111.

Selection circuit 530 to which drive pulse ΦODG is input selects one of input wires of buffer elements 112a in three drive circuits 111 for a pixel column, and conveys drive pulse ΦODG to the selected input wire.

Selection circuit 530 to which drive pulse ΦTG1 is input selects one of input wires of buffer elements 112a in three drive circuits 111 for a pixel column, and conveys drive pulse ΦTG1 to the selected input wire.

Similarly, selection circuit 530 to which drive pulse ΦTG2 is input selects one of input wires of buffer elements 112a in three drive circuits 111 for a pixel column, and conveys drive pulse ΦTG3 to the selected input wire.

Three selection circuits 530 for one pixel column each exclusively select buffer element 112a to which a drive pulse is conveyed.

Wire swapper 510e includes three selection circuits 531 for each pixel column. Selection circuits 531 each include three input terminals and one output terminal, select one of the input terminals, and connect the selected input terminal to the output terminal. Three selection circuits 531 for one pixel column swap output wires of buffer elements 112c in three drive circuits 111 connected thereto. In the example of a configuration in FIG. 8, selection circuits 531 each perform select operation to place swapped wires by corresponding selection circuit 530 into its original state.

Accordingly, three selection circuits 530 and 531 for pixel columns function to swap drive circuit 111 in one column to drive circuit 111 in a different column according to select switch signal 540.

For example, when select switch signal 540 indicates "0", drive circuit 111 is connected to control wire 114 in the same column. In this case, drive circuit 111A is connected to reset control wire 114A, drive circuit 111B is connected to first read control wire 114B, and drive circuit 111C is connected to second read control wire 114C.

When select switch signal 540 indicates "1", drive circuit 111 is connected to another control wire not in the same column. In this case, drive circuit 111B is connected to reset control wire 114A, drive circuit 111C is connected to first read control wire 114B, and drive circuit 111A is connected to second read control wire 114C.

When select switch signal 540 indicates "2", drive circuit 111 is connected to yet another control wire not in the same column. In this case, drive circuit 111C is connected to reset control wire 114A, drive circuit 111A is connected to first read control wire 114B, and drive circuit 111B is connected to second read control wire 114C.

An example in which select switch signal 540 has three values is shown, yet select switch signal 540 may have two values or four or more values.

Figure 9:
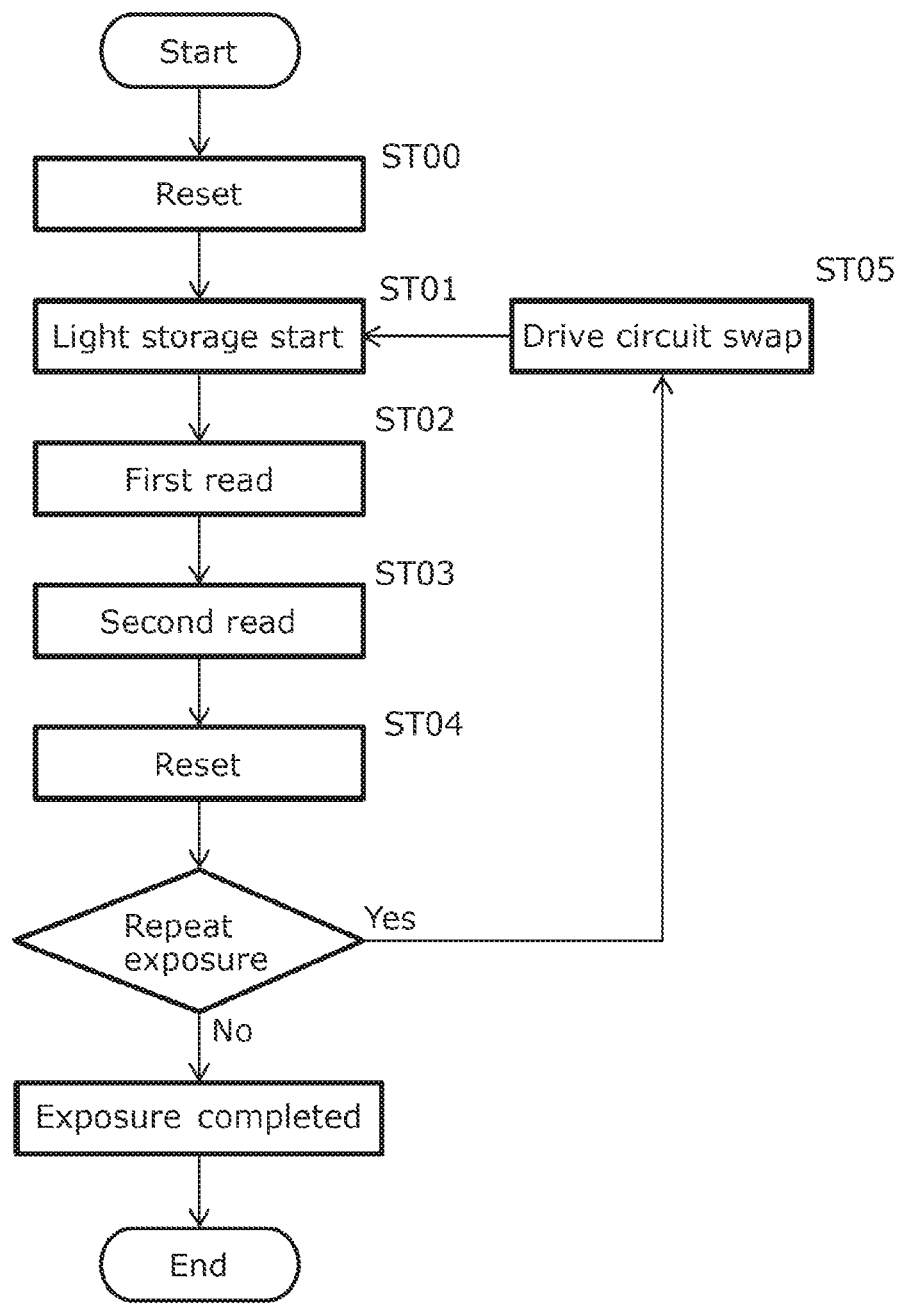
FIG. 9 is a flowchart illustrating exposure operation in Embodiment 3.

Next, exposure operation in Embodiment 3 is to be described with reference to the flowchart in FIG. 9. The flowchart in FIG. 9 additionally includes drive circuit swap step ST05 as compared to the flowchart in FIG. 5, and the other steps are the same as those in Embodiment 1. Normally, exposure is performed multiple times within a single frame when a distance to object 190 is to be measured. In Embodiment 3, when exposure is repeated after reset step ST04, the processing proceeds to drive circuit swap step ST05. In drive circuit swap step ST05, select switch signal 540 is switched, thus switching buffer element 112 through which a drive signal passes to another buffer element 112. When drive circuit swap step ST05 is completed, the processing proceeds to light storage start step ST01 again. Each time exposure is repeated, drive circuit 111 through which a drive signal passes is switched to another drive circuit 111.

Here, electrode drive wire 114 includes three types of control wires, namely reset control wire 114A, first read control wire 114B, and second read control wire 114C.

It is assumed that wire swapper 510 swaps between three types of control wires each time exposure is performed. It is assumed that exposure is performed for a total of (l+m+n) times within one frame, and a drive signal applied to reset control wire 114A passes through drive circuit 111A in the lth exposure, passes through drive circuit 111B in the mth exposure, and passes through drive circuit 111C in the nth exposure. It is assumed that a drive signal applied to first read control wire 114B passes through drive circuit 111B in the lth exposure, passes through drive circuit 111C in the mth exposure, and passes through drive circuit 111A in the nth exposure. It is assumed that a drive signal applied to second read control wire 114C passes through drive circuit 111C in the lth exposure, passes through drive circuit 111A in the mth exposure, and passes through drive circuit 111B in the nth exposure. When Δta denotes a time lag of drive circuit 111A, Δtb denotes a time lag of drive circuit 111B, and Δtc denotes a time lag of drive circuit 111C, measurement distance difference ΔZ1 of a pixel that reset control wire 114A drives, measurement distance difference ΔZ2 of a pixel that first read control wire 114B drives, and measurement distance difference ΔZ3 of a pixel that second read control wire 114C drives are obtained by Expressions (6) to (8) below.

[Math 6]

$$\Delta Z1 = \frac{c}{2}\left(\frac{l\Delta ta + m\Delta tb + n\Delta tc}{l+m+n}\right) \quad (6)$$

$$\Delta Z2 = \frac{c}{2}\left(\frac{l\Delta tb + m\Delta tc + n\Delta a}{l+m+n}\right) \quad (7)$$

$$\Delta Z3 = \frac{c}{2}\left(\frac{l\Delta tc + m\Delta ta + n\Delta b}{l+m+n}\right) \quad (8)$$

When the number of times exposure is performed in which a drive signal passes through drive circuit 111A, the number of times exposure is performed in which a drive signal passes through drive circuit 111B, the number of times exposure is performed in which a drive signal passes through drive circuit 111C, the number of reset control wires 114A, the number of first read control wires 114B, and the number of second read control wires 114C are all the same, l=m=n, and measurement distance differences ΔZ1, ΔZ2, and ΔZ3 are obtained by Expression (9) below.

[Math 7]

$$\Delta Z1 = \Delta Z2 = \Delta Z3 = \frac{C}{2}\left(\frac{\Delta ta + \Delta tb + \Delta tc}{3}\right) \quad (9)$$

Thus, measurement distance difference ΔZ1 of pixels 101 that reset control wire 114A drives, measurement distance difference ΔZ2 of pixels 101 that first read control wire 114B drives, and measurement distance difference ΔZ3 of pixels 101 that second read control wire 114C drives are all proportional to (Δta+Δtb+Δtc)/3 resulting from averaging time lag Δta of drive circuit 111A, time lag Δtb of drive circuit 111B, and time lag Δtc of drive circuit 111C. As a result, time lags of reset control wire 114A, first read control wire 114B, and second read control wire 114C are cancelled out, thus achieving high measurement accuracy.

Note that FIG. 8 illustrates an example in which wire swapper 510d and wire swapper 510e are provided on the input side and the output side of drive circuit array 110, respectively, and all drive circuits 111 can be swapped with all drive circuits 111. The configuration is not limited thereto, and may be a configuration in which one or more buffer elements 112 or wires in drive circuit 111 are swapped. For example, wire swapper 510d in FIG. 8 may be provided in output wires of buffer elements 112b, instead of being provided in input wires of buffer elements 112a.

In FIG. 8, the same circuit as wire swapper 510e may be provided instead of wire swapper 510d. The same circuit as wire swapper 510d may be provided instead of wire swapper 510e.

FIG. 7 and FIG. 8 each illustrate an example in which three electrode drive wires 114 for each column are swapped, but nevertheless the same advantageous effects can be achieved even when two or even four or more electrode drive wires 114 are swapped.

As described above, in solid-state imaging device 200 according to Embodiment 3, wire swapper 510 may include selection circuit 530 or 531 that selects a drive circuit that is a swap target, according to a select switch signal.

Summary

As described above with reference to the drawings, solid-state imaging device 200 according to the embodiment includes photoelectric converter 300 that converts received light into charge, read electrodes (first read electrode 330 and second read electrode 350) that control reading of charge generated in photoelectric converter 300, reset electrode 310 that controls discharge of charge generated in photoelectric converter 300, pixel array 100 in which photoelectric converters 300, the above read electrodes, and reset electrodes 310 are disposed, read control wires (first read control wire 114B and second read control wire 114C) that drive the above read electrodes, reset control wire 114A that drives reset electrodes 310, drive circuits 111 in each of which buffer elements 112 in at least two stages are cascaded, and which apply drive pulses to the above read control wires and reset control wire 114A and are aligned in columns, and first wire 113 that short-circuits output wires of buffer elements 112 in at least two different columns.

With this configuration, drive pulses are applied from drive circuits 111 through the read control wires and reset control wire 114A to electrodes of pixels 101 disposed in a matrix, and transfer of charge stored in photoelectric converter 300 is controlled. In drive circuits 111, buffer elements 112 are cascaded, and output wires of buffer elements 112 in columns are electrically connected by first wire 113 at low impedance. As a result, potentials at the columns change so as to match, and thus a difference in delay is reduced.

Further, first wire 113 has a length longer than a side extending parallel to the first wire out of four sides that define an effective region constituted by pixels 101, and the more downstream first wire 113 is provided, the lower impedance of first wire 113 is. Furthermore, the more downstream stage buffer element 112 is in, the higher drive capability the buffer element has, and electrode drive wires 114 are independent from column-to-column.

By first wires 113 short-circuiting output wires of buffer elements in two or more stages, even if a difference in delay occurs in columns and a potential difference is generated, a period in which a potential difference is generated is short since a difference in delay is small, and buffer element 112 in a more upstream stage has lower drive capability, and thus less through-current flows. Accordingly, risk of melting a wire and damaging buffer element 112 can be lowered. In addition, the impedance of first wire 113 that short-circuits output wires of buffer element 112 in a more downstream stage is decreased, so that risk of melting a wire can be lowered. As a result, first wire 113 can reduce a difference in delay of a drive signal for each column caused due to a difference in characteristics of a drive buffer and a difference in parasitic component caused by the layout can be reduced without the need of calibration.

Drive circuit array 110 includes one or more wire swappers 510 that swap a wire in drive circuit 111 with a wire in drive circuit 111 in a different column, and one or more wire swappers 510 each include selection circuits 530 and 531 that each select columns for which wires are swapped according to a selection switch signal.

Since buffer elements 112 in two or more stages in different columns are cascaded, the phases of drive signals can be made different, and even if buffer elements cannot be short-circuited in columns, a difference in delay can be reduced. With regard to a difference in delay in columns due to a difference in layout and manufacturing variations of drive circuits 111, by swapping paths through which drive signals flow, delay times of different drive signals can be averaged. Utilizing multiple exposure in which TOF is used, selection circuit 530 can average delay times by changing paths of drive signals during an exposure period, and reduce a difference in delay of drive signals passing through different columns and having different phases.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

As described above, the imaging apparatus according to the present disclosure is useful as an imaging apparatus that can reduce a difference in delay of drive signals between columns without the need of calibration, and can achieve high measurement accuracy while an increase in the circuit scale is reduced.

The invention claimed is:

1. A solid-state imaging device comprising:
a plurality of pixels disposed in a matrix of pixel rows and pixel columns;
a plurality of control wires provided for the pixel rows or the pixel columns, and each connected to at least two pixels out of the plurality of pixels, the at least two pixels being included in one of the pixel rows or the pixel columns for which the control wire is provided;
a plurality of drive circuits that are provided for the plurality of control wires, wherein each of the plurality of drive circuits includes buffer elements in at least two stages, and outputs a control signal to a corresponding one of the plurality of control wires for which the drive circuit is provided, the buffer elements in the at least two stages being connected in series and having output wires; and
a first wire that short-circuits the output wires of the buffer elements in one of the at least two stages in at least two of the plurality of drive circuits, wherein:
each of the plurality of drive circuits further includes:
an input terminal; and
an output terminal,
the input terminal is independently provided for each of the plurality of drive circuits,
the output terminal is independently provided for each of the plurality of drive circuits, and
in each of the plurality of drive circuits, the buffer elements in the at least two stages are provided between the input terminal and the output terminal.

2. The solid-state imaging device according to claim 1, wherein the first wire averages delays of at least two of the plurality of control wires that occur in at least two of the pixel rows or at least two of the pixel columns.

3. The solid-state imaging device according to claim 1, wherein the plurality of pixels include optical black pixels and normal pixels that are not the optical black pixels, and
the first wire has a length longer than a side out of four sides that define an effective region constituted by the normal pixels, the side extending parallel to the first wire.

4. The solid-state imaging device according to claim 1, wherein the plurality of drive circuits include M drive circuit groups into which the plurality of drive circuits are divided, M being an integer greater than or equal to 2, and
the first wire is provided for each of the M drive circuit groups, and short-circuits output wires of the buffer elements in the M drive circuit group.

5. The solid-state imaging device according to claim 4, wherein one of the M drive circuit groups consists of one or more drive circuits that operate in a pixel-thinned operation mode.

6. The solid-state imaging device according to claim 1, wherein the first wire is provided for each of the at least two stages of the buffer elements, excluding a most upstream stage.

7. The solid-state imaging device according to claim 6, wherein the first wire provided for buffer elements in one stage out of the buffer elements in the at least two stages has impedance lower than impedance of the first wire provided for buffer elements in a stage upstream from the one stage out of the buffer elements in the at least two stages.

8. The solid-state imaging device according to claim 6, wherein the first wire provided for buffer elements in one stage out of the buffer elements in the at least two stages has a width greater than a width of the first wire provided for buffer elements in a stage upstream from the one stage out of the buffer elements in the at least two stages.

9. The solid-state imaging device according to claim 1, wherein buffer elements in one stage out of the buffer elements in the at least two stages have drive capability higher than drive capability of buffer elements in a stage upstream from the one stage out of the buffer elements in the at least two stages.

10. The solid-state imaging device according to claim 1, wherein the plurality of pixels each include a photoelectric converter that converts light into charge, and a read electrode for reading the charge from the photoelectric converter, and
the plurality of control wires are each connected to the read electrode in each of the at least two pixels.

11. The solid-state imaging device according to claim 1, wherein the plurality of pixels each include a reset electrode for resetting charge in the pixel, and
the plurality of control wires are each connected to the reset electrode in each of the at least two pixels.

12. The solid-state imaging device according to claim 1, wherein the plurality of pixels each include a photoelectric converter that converts light into charge, a first read electrode for reading the charge from the photoelectric converter, and a reset electrode for resetting the charge in the pixel,
the plurality of control wires provided for the pixel columns each include a first read control wire connected to the first read electrode in each of the at least two pixels, and a reset control wire connected to the reset electrode in each of the at least two pixels, and
the solid-state imaging device includes, for each of the pixel columns, a first drive circuit connected to the first read control wire, and a second drive circuit connected to the reset control wire, the first drive circuit and the second drive circuit being included in the plurality of drive circuits.

13. The solid-state imaging device according to claim 12, wherein the plurality of pixels each further include a second read electrode for reading the charge from the photoelectric converter,
the plurality of control wires provided for the pixel columns each further include a second read control wire connected to the second read electrode in each of the at least two pixels, and
the solid-state imaging device further includes, for each of the pixel columns, a third drive circuit connected to the second read control wire, the third drive circuit being included in the plurality of drive circuits.

14. The solid-state imaging device according to claim 1, further comprising:
a wire swapper that causes wires in the plurality of drive circuits to cross, to substantially swap between buffer elements in a same stage in the plurality of drive circuits, out of the buffer elements in the at least two stages in each of the plurality of drive circuits.

15. The solid-state imaging device according to claim 14, wherein the wire swapper includes a selection circuit that selects, according to a selection switch signal, drive circuits to be swapped out of the plurality of drive circuits.

16. The solid-state imaging device according to claim 15, wherein two or more wire swappers are provided, the two or more wire swappers each being the wire swapper, and
each of the two or more wire swappers is provided at input wires or output wires of the buffer elements in the at least two stages in the plurality of drive circuits.

17. An imaging apparatus comprising:
the solid-state imaging device according to claim 1; and
a signal processing circuit that generates a depth image or a brightness image based on a signal received by the solid-state imaging device.

* * * * *